United States Patent
Chiffey et al.

(10) Patent No.: US 9,604,174 B2
(45) Date of Patent: Mar. 28, 2017

(54) EXHAUST SYSTEM

(71) Applicant: Johnson Matthey Public Limited Company, London (GB)

(72) Inventors: Andrew Francis Chiffey, Ware (GB); Cathal Francis Prendergast, Gamlingay (GB)

(73) Assignee: Johnson Matthey Public Limited Company, London (GB)

( * ) Notice: Subject to any disclaimer, the term of this patent is extended or adjusted under 35 U.S.C. 154(b) by 396 days.

(21) Appl. No.: 14/073,985

(22) Filed: Nov. 7, 2013

(65) Prior Publication Data

US 2014/0161679 A1     Jun. 12, 2014

Related U.S. Application Data

(60) Provisional application No. 61/723,384, filed on Nov. 7, 2012.

(51) Int. Cl.

| | | |
|---|---|---|
| *B01D 53/94* | (2006.01) | |
| *F01N 3/10* | (2006.01) | |
| *F01N 3/20* | (2006.01) | |
| *F01N 3/035* | (2006.01) | |
| *F01N 13/00* | (2010.01) | |

(52) U.S. Cl.
CPC ......... *B01D 53/94* (2013.01); *B01D 53/9477* (2013.01); *F01N 3/035* (2013.01); *F01N 3/106* (2013.01); *F01N 3/2066* (2013.01); *F01N 13/009* (2014.06); *F01N 13/0093* (2014.06); *B01D 2251/2067* (2013.01); *B01D 2255/1021* (2013.01); *B01D 2255/1023* (2013.01); *B01D 2255/1025* (2013.01); *B01D 2255/20707* (2013.01); *B01D 2255/20723* (2013.01); *B01D 2255/20776* (2013.01); *B01D 2255/50* (2013.01); *F01N 2240/40* (2013.01); *F01N 2510/0682* (2013.01); *Y02T 10/24* (2013.01)

(58) Field of Classification Search
None
See application file for complete search history.

(56) References Cited

U.S. PATENT DOCUMENTS

| | | |
|---|---|---|
| 6,805,849 B1 | 10/2004 | Andreasson et al. |
| 2008/0302088 A1 | 12/2008 | Koehler et al. |
| 2011/0030350 A1* | 2/2011 | Kato ............... F01N 3/103 60/286 |
| 2011/0225952 A1 | 9/2011 | Witte-Merl et al. |
| 2013/0149220 A1* | 6/2013 | Swallow ........... B01D 53/9418 423/213.5 |

FOREIGN PATENT DOCUMENTS

| | | |
|---|---|---|
| DE | 102006051788 A1 | 5/2008 |
| EP | 2295754 A1 | 3/2011 |
| FR | 2960593 A1 | 12/2011 |

OTHER PUBLICATIONS

Messerer—DE 102006051788A1—machine translation, 2008.*
Julien—FR2960593A1—machine translation, 2011.*
Johnson Mattey. Selective Catalytic Reduction: The NOx Removal Method of Choice from Passenger Cars to Power Plants. Global Emissions Management. vol. 3, Issue 1, Nov. 2010. pp. 1-3. http://ect.jmcatalysts.com/documents/gem3.1-november-2010-selective-catalytic-reduction-the-nox-removal-from-passenger-cars.pdf.*
International Search Report for corresponding PCT Patent Application No. PCT/GB2013/052921.

* cited by examiner

*Primary Examiner* — Walter D Griffin
*Assistant Examiner* — Jelitza Perez

(57) ABSTRACT

An exhaust system, and a catalyzed substrate, is disclosed. The system comprises a catalyzed substrate, a counterflow urea injector downstream of the catalyzed substrate, and a first selective catalytic reduction (SCR) catalyst downstream of the counterflow injector. The catalyzed substrate has an inlet end, an outlet end, an axial length extending from the inlet to the outlet, an inlet zone extending from the inlet, and an outlet zone extending from the outlet. The inlet zone comprises an oxidation catalyst and the outlet zone comprises a catalyst selected from the group consisting of a urea hydrolysis catalyst and a second SCR catalyst. The counterflow urea injector directs urea toward the outlet zone of the catalyzed substrate so that at least a portion of the urea contacts the outlet zone prior to contacting the first SCR catalyst.

11 Claims, No Drawings

EXHAUST SYSTEM

FIELD OF THE INVENTION

The invention relates to a catalyzed substrate and an exhaust system for use with a counterflow urea injector.

BACKGROUND OF THE INVENTION

Internal combustion engines produce exhaust gases containing a variety of pollutants, including hydrocarbons, carbon monoxide, nitrogen oxides ("$NO_x$"), sulfur oxides, and particulate matter. Increasingly stringent national and regional legislation has lowered the amount of pollutants that can be emitted from such diesel or gasoline engines. Many different techniques have been applied to exhaust systems to clean the exhaust gas before it passes to atmosphere.

U.S. Pat. No. 6,805,849, for example, discloses an emission reduction method for reducing particulates, $NO_x$, other pollutants. The method comprises passing the exhaust gas over an oxidation catalyst under conditions effective to convert at least a portion of NO in the gas stream to $NO_2$ and enhance the $NO_2$ content of the gas stream, removing at least a portion of the particulates in a particulate trap, reacting trapped particulate with $NO_2$, adding reductant fluid to the gas stream to form a gas mixture downstream of the trap, and passing the gas mixture over an SCR catalyst under $NO_x$ reduction conditions. The reductant fluid is suitably ammonia ($NH_3$) but ammonia precursors including urea, ammonium carbamate can also be used.

As with any automotive system and process, it is desirable to attain still further improvements in exhaust gas treatment systems. We have discovered a new system that utilizes the counterflow injection of urea into the exhaust gas upstream of an SCR catalyst.

SUMMARY OF THE INVENTION

The invention is an exhaust system for internal combustion engines. The system comprises a catalyzed substrate, a counterflow urea injector downstream of the catalyzed substrate, and a first selective catalytic reduction (SCR) catalyst downstream of the counterflow injector. The catalyzed substrate has an inlet end, an outlet end, an axial length extending from the inlet to the outlet, an inlet zone extending from the inlet, and an outlet zone extending from the outlet. The inlet zone comprises an oxidation catalyst and the outlet zone comprises a catalyst selected from the group consisting of a urea hydrolysis catalyst and a second SCR catalyst. The counterflow urea injector directs urea toward the outlet zone of the catalyzed substrate so that at least a portion of the urea contacts the outlet zone prior to contacting the first SCR catalyst. This system may be particularly useful in systems with limited space between the urea injector and main SCR catalyst.

DETAILED DESCRIPTION OF THE INVENTION

The exhaust system of the invention comprises a catalyzed substrate, a counterflow urea injector, and a first selective catalytic reduction (SCR) catalyst.

The first SCR catalyst may comprise any known SCR catalysts, which are well-known in the art. A SCR catalyst is a catalyst that reduces $NO_x$ to $N_2$ by reaction with nitrogen compounds (such as ammonia or urea) or hydrocarbons (lean $NO_x$ reduction). Preferably, the first SCR catalyst is comprised of a vanadia-titania catalyst, a vanadia-tungsta-titania catalyst, or a metal/zeolite. The metal/zeolite catalyst comprises a metal and a zeolite. Preferred metals include iron and copper. The zeolite is preferably a beta zeolite, a faujasite (such as an X-zeolite or a Y-zeolite, including NaY and USY), an L-zeolite, a ZSM zeolite (e.g., ZSM-5, ZSM-48), an SSZ-zeolite (e.g., SSZ-13, SSZ-41, SSZ-33), a ferrierite, a mordenite, a chabazite, an offretite, an erionite, a clinoptilolite, a silicalite, an aluminum phosphate zeolite (including metalloaluminophosphates such as SAPO-34), a mesoporous zeolite (e.g., MCM-41, MCM-49, SBA-15), or mixtures thereof; more preferably, the zeolite is a beta zeolite, a ferrierite, or a chabazite.

The first SCR catalyst is preferably coated on a ceramic or a metallic substrate. The substrate is typically designed to provide a number of channels through which vehicle exhaust passes, and the surface of the channels will be preferably be coated with the first SCR catalyst.

A ceramic substrate may be made of any suitable refractory material, e.g., alumina, silica, titania, ceria, zirconia, magnesia, zeolites, silicon nitride, silicon carbide, zirconium silicates, magnesium silicates, aluminosilicates and metallo aluminosilicates (such as cordierite and spodumene), or a mixture or mixed oxide of any two or more thereof. Cordierite, a magnesium aluminosilicate, and silicon carbide are particularly preferred. A metallic substrate may be made of any suitable metal, and in particular heat-resistant metals and metal alloys such as titanium and stainless steel as well as ferritic alloys containing iron, nickel, chromium, and/or aluminum in addition to other trace metals.

The substrate for the SCR catalyst may be a filter substrate or a flow-through substrate. Preferably, the first SCR catalyst is coated onto a filter, which is known as a selective catalytic reduction filter (SCRF). SCRFs are single-substrate devices that combine the functionality of an SCR and particulate filter. They are used to reduce $NO_x$ and particulate emissions from internal combustion engines.

The catalyzed substrate of the invention has an inlet end, an outlet end, and an axial length extending from the inlet end to the outlet end.

The catalyzed substrate preferably comprises a ceramic substrate or a metallic substrate, as described above. The substrate is preferably a flow-through substrate or a filter substrate. Most preferably, the substrate is a flow-through substrate. In particular, the flow-through substrate is a flow-through monolith preferably having a honeycomb structure with many small, parallel thin-walled channels running axially through the substrate and extending throughout the substrate. The channel cross-section of the substrate may be any shape, but is preferably square, sinusoidal, triangular, rectangular, hexagonal, trapezoidal, circular, or oval.

The catalyzed substrate has two catalyst zones: an inlet zone extending from the inlet end, and an outlet zone extending from the outlet end.

The inlet zone of the catalyzed substrate comprises an oxidation catalyst. The oxidation catalyst preferably comprises a platinum group metal (PGM), including palladium, platinum, rhodium, and mixtures thereof; most preferably, the PGM is platinum, palladium, and mixtures thereof. The oxidation catalyst is preferably PGM which has been loaded onto a support. The support is preferably a zeolite, an inorganic oxide, or mixtures thereof. Preferred inorganic oxides include alumina, silica, titania, zirconia, ceria, niobia, tantalum oxides, molybdenum oxides, tungsten oxides, mixed oxides or composite oxides of any two or more thereof (e.g. silica-alumina, ceria-zirconia or alumina-ceriazirconia), and mixtures thereof. An alumina or silica-alumina is particularly preferred. Preferred zeolites include a beta zeolite, a ZSM zeolite, a ferrierite, or a chabazite.

The outlet zone comprises a catalyst selected from the group consisting of a urea hydrolysis catalyst and a second SCR catalyst. The urea catalyst preferably includes titania or stabilized titania, such as $WO_x/TiO_2$.

The second SCR catalyst preferably comprises a metal/zeolite catalyst, vanadia-titania catalyst, or a vanadia-tungsta-titania catalyst. More preferably, the second SCR catalyst is copper or iron loaded on a zeolite, including mixtures of copper and iron. The zeolite may be any natural or synthetic zeolite, including molecular sieves, and is preferably composed of aluminum, silicon, and/or phosphorus. The zeolites typically have a three-dimensional arrangement of $SiO_4$, $AlO_4$, and/or $PO_4$ that are joined by the sharing of oxygen atoms. The zeolite frameworks are typically anionic, which are counterbalanced by charge compensating cations, typically alkali and alkaline earth elements (e.g., Na, K, Mg, Ca, Sr, and Ba) and also protons. Other metals (e.g., Fe, Ti, and Ga) may be incorporated into the framework of the zeolite to produce a metal-incorporated zeolite (e.g., a titanosilicalite).

The zeolite is preferably a beta zeolite, a faujasite (such as an X-zeolite or a Y-zeolite, including NaY and USY), an L-zeolite, a ZSM zeolite (e.g., ZSM-5, ZSM-48), an SSZ-zeolite (e.g., SSZ-13, SSZ-41, SSZ-33), a ferrierite, a mordenite, a chabazite, an offretite, an erionite, a clinoptilolite, a silicalite, an aluminum phosphate zeolite (including metalloaluminophosphates such as SAPO-34), a mesoporous zeolite (e.g., MCM-41, MCM-49, SBA-15), or mixtures thereof; more preferably, the zeolite is a beta zeolite, a ferrierite, or a chabazite.

The catalyzed substrate of the present invention may be prepared by processes well known in the prior art. Preferably, the catalytic zones are deposited on the substrate using washcoat procedures. A representative process for preparing the catalyzed substrate using a washcoat procedure is set forth below. It will be understood that the process below can be varied according to different embodiments of the invention. Also, the order of addition of the inlet zone and the outlet zone onto the substrate is not considered critical. Thus, the inlet zone can be washcoated on the substrate prior to washcoating the outlet zone or the outlet zone can be washcoated on the substrate prior to washcoating the inlet zone.

The inlet zone of the catalyzed substrate is preferably prepared using a washcoat procedure. The oxidation catalyst (e.g., a PGM loaded onto a support) may be washcoated on the substrate by any known technique. For instance, the platinum group metal may be added to a support prior to the washcoating step or may be added to a support-coated substrate after washcoating the support onto the substrate. If the PGM is added to the support prior to washcoating the inlet zone of the substrate, it can be loaded onto the support by any known means, the manner of addition is not considered to be particularly critical. For example, a platinum compound (such as platinum nitrate) may be supported on the support by impregnation, adsorption, ion-exchange, incipient wetness, precipitation, or the like.

The washcoating is preferably performed by first slurrying finely divided particles of the oxidation catalyst (or just the support) in an appropriate solvent, preferably water, to form the slurry. The slurry preferably contains between 5 to 70 weight percent solids, more preferably between 10 to 50 weight percent. Preferably, the oxidation catalyst (or support) particles are milled or subject to another comminution process in order to ensure that substantially all of the solid particles have a particle size of less than 20 microns in an average diameter, prior to forming the slurry. Additional components, such as stabilizers or promoters may also be incorporated in the slurry as a mixture of water soluble or water-dispersible compounds or complexes.

The substrate may then be coated one or more times with the slurry such that there will be deposited on the substrate the desired loading of catalytic materials. If only the support is deposited on the substrate, the platinum group metal may then be added to the support-coated substrate by any known means, including impregnation, adsorption, or ion-exchange of a platinum compound (such as platinum nitrate). Preferably, the substrate is coated with the slurry so that the inlet zone only occupies from 60 to 90 percent of the axial length of the substrate from the inlet end, more preferably from 70 to 90 percent of the axial length the substrate.

After the inlet zone of the substrate has been coated with the oxidation catalyst slurry, the coated substrate is typically dried by heating at an elevated temperature of preferably 80 to 150° C. The substrate may also be calcined at higher temperatures (such as 400 to 600° C.) but calcination is typically not required before the addition of the outlet zone. Following the coating of the inlet zone, further layers of oxidation catalyst of the same or different composition may be applied to the first layer of oxidation catalyst coating to produce a multi-layered first zone. Preferably, the PGM loading in the inlet zone is from 1 to 200 $g/ft^3$, and more preferably from 5 to 150 $g/ft^3$.

The outlet zone of the catalyzed substrate is preferably prepared using a washcoat procedure, as described above. In the case of a copper or iron/zeolite SCR catalyst, the copper or iron is preferably first loaded onto the zeolite by any known means to form a Cu(Fe)/zeolite species prior to washcoating the outlet zone of the substrate, the manner of addition is not considered to be particularly critical. For example, a copper compound (such as copper acetate) or an iron compound (such as iron acetate) may be supported on the zeolite by impregnation, adsorption, ion-exchange, incipient wetness, precipitation, or the like. Other metals may also be added to the Cu(Fe)/zeolite combination.

Preferably, the substrate (at the opposite end of the substrate from where the inlet zone was deposited) will be coated one or more times with the slurry of Cu(Fe)/zeolite, following an optional milling or comminution, according to the process described above. When the second SCR catalyst is copper or iron loaded on a zeolite, the copper or iron loading in the outlet zone is preferably from 5 to 200 $g/ft^3$.

Preferably, the substrate is coated with the outlet zone slurry so that the outlet zone and the inlet zone have little or no overlap. The outlet zone will preferably only occupy from 10 to 40 percent of the axial length of the substrate, more preferably from 10 to 30 percent of the axial length of the substrate.

After the substrate has been coated with the second slurry, the coated substrate is typically dried and then calcined by heating at an elevated temperature. Preferably, the calcination occurs at 400 to 600° C. for approximately 1 to 8 hours.

The exhaust system of the invention comprises a counterflow urea injector. A counterflow urea injector is an injector that injects urea into the exhaust gas stream counter to the flow of the exhaust gas stream. The counterflow urea injector is located downstream of the catalyzed substrate, and a first SCR catalyst is located downstream of the counterflow urea injector. The counterflow urea injector directs urea toward the outlet zone of the catalyzed substrate so that at least a portion of the urea contacts the outlet zone prior to contacting the first SCR catalyst. Preferably, at least 5 percent of the urea contacts the outlet zone prior to contacting the first SCR catalyst, more preferably at least 10 percent.

The urea injector system will preferably consist of a nozzle to produce well defined droplets of urea solution. The nozzle will be positioned to direct the urea solution towards the rear face of the upstream catalyzed substrate. The droplet size is preferably less than 500 microns to allow rapid evaporation and urea decomposition. The injector pressure and pump rate will be such to allow effective mixing in the exhaust gas stream. The distance of urea solution penetration into the upstream catalyzed substrate will depend on several factors, namely the injector pressure and exhaust gas flow rate. The urea injection system will also preferably consist of a urea tank, transfer lines and possibly a heating system to avoid freezing of the urea solution.

The invention also encompasses the catalyzed substrate itself, and a method for treating an exhaust gas from an internal combustion engine. The method comprises contacting the exhaust gas with the catalyzed substrate such that the exhaust gas first contacts the oxidation catalyst-containing inlet zone of the catalyzed substrate. CO, hydrocarbons and $NO_x$ in the exhaust gas will be oxidized in the presence of the oxidation catalyst. The exhaust gas will then pass to the outlet zone of the catalyzed substrate, which contains a urea hydrolysis catalyst or a second SCR catalyst. Urea is injected into the exhaust gas downstream of the catalyzed substrate and counter to the flow of the exhaust gas so that at least a portion of the urea contacts the outlet zone. The exhaust gas and urea, following partial contact with the outlet zone, is then contacted with the first SCR catalyst.

By passing at least a portion of the urea into the outlet zone when it contains a urea hydrolysis catalyst, the urea may be hydrolyzed more quickly to ammonia for quicker reaction over the first SCR catalyst (when no $NO_x$ conversion is required prior to the main SCR catalyst). Alternatively, by providing an SCR coating to the outlet zone, the method provides additional SCR catalyst volume as well as having an SCR coating in a hotter location closer to the engine, thus boosting $NO_x$ conversion of the system.

The following examples merely illustrate the invention. Those skilled in the art will recognize many variations that are within the spirit of the invention and scope of the claims.

EXAMPLE 1

Preparation of Catalyzed Substrates

Catalyzed Substrate 1: A catalyst according to the invention is prepared by coating the foil of a metallic substrate (1.4 L volume). An oxidation catalyst washcoat is prepared by adding appropriate amounts of soluble platinum and palladium salts to a pre-milled slurry of silica-alumina and beta zeolite (d90<20 microns) such that the final calcined catalyst coating comprises 2.0 $g/in^3$ silica-alumina and 0.5 $g/in^3$ beta zeolite. This coating is applied to the inlet end of the metallic substrate using established coating techniques to a coating depth equal to 70% of the total length of the substrate foil matrix, and the coated substrate is dried at 110° C., and then calcined at 500° C. The PGM content in the oxidation catalyst inlet zone is 140 $g/ft^3$ with a Pt:Pd weight ratio of 4:1.

A second catalyst coating capable of urea hydrolysis is prepared using a slurry of copper ion exchanged zeolite (SSZ-13). The copper loading of the exchanged zeolite is 3 wt. %. This second washcoat is applied to the outlet end of the metallic substrate using established coating techniques to a coating depth equal to 30% of the total length of the substrate foil matrix. The coated substrate is dried at 110° C., and then calcined at 500° C.

EXAMPLE 2

Testing Procedures

The catalyzed substrate according to the invention should be mounted in a location close coupled to the engine, preferably behind the turbocharger. The urea injection hardware (tank, pump, nozzles and the like) are selected for suitable injection counterflow to the exhaust gas coming from the engine. The first SCR catalyst is located downstream of the counterflow urea injector, at a distance preferably less than 0.5 meters.

If the catalyzed substrate of the invention is on a wall flow diesel particulate filter substrate, then this should be located close coupled to the engine or immediately downstream of an upstream catalyst that is located behind the turbo.

We claim:

1. An exhaust system for an internal combustion engine, the system comprising a catalyzed substrate, a counterflow urea injector downstream of the catalyzed substrate, and a first selective catalytic reduction (SCR) catalyst downstream of the counterflow urea injector, wherein:
   (a) the catalyzed substrate has an inlet end, an outlet end, an axial length extending from the inlet end to the outlet end, an inlet zone extending from the inlet end, and an outlet zone extending from the outlet end,
   (b) the inlet zone of the catalyzed substrate comprises an oxidation catalyst and the outlet zone comprises a second SCR catalyst; and
   (c) the counterflow urea injector directs urea toward the outlet zone of the catalyzed substrate so that at least a portion of the urea contacts the outlet zone prior to contacting the first SCR catalyst.

2. The exhaust system of claim 1 wherein the catalyzed substrate comprises a flow-through monolith.

3. The exhaust system of claim 1 wherein the catalyzed substrate comprises a filter substrate.

4. The exhaust system of claim 1 wherein the inlet zone of the catalyzed substrate covers 60 to 90 percent of the axial length of the catalyzed substrate, as measured from the inlet end, and the outlet zone covers 10 to 40 percent of the axial length of the catalyzed substrate, as measured from the outlet end.

5. The exhaust system of claim 1 wherein the oxidation catalyst comprises a platinum group metal selected from the group consisting of palladium, platinum, rhodium, and mixtures thereof.

6. The exhaust system of claim 1 wherein the first SCR catalyst comprises a metal/zeolite catalyst, a vanadia-titania catalyst, or a vanadia-tungsta-titania catalyst.

7. The exhaust system of claim 1 wherein the second SCR catalyst comprises a metal/zeolite catalyst, a vanadia-titania catalyst, or a vanadia-tungsta-titania catalyst.

8. A catalyzed substrate comprising an inlet end, an outlet end, an axial length extending from the inlet end to the outlet end, an inlet zone extending from the inlet end, and an outlet zone extending from the outlet end, wherein the inlet zone comprises an oxidation catalyst and the outlet zone comprises an SCR catalyst.

9. The catalyzed substrate of claim 8 wherein the inlet zone covers 70 to 90 percent of the axial length of the catalyzed substrate, as measured from the inlet end; and the outlet zone covers 10 to 30 percent of the axial length of the catalyzed substrate, as measured from the outlet end.

10. The catalyzed substrate of claim 8 wherein the wherein the oxidation catalyst comprises a platinum group metal selected from the group consisting of palladium, platinum, rhodium, and mixtures thereof.

11. The catalyzed substrate of claim 8 wherein the SCR catalyst comprises a metal/zeolite catalyst, a vanadia-titania catalyst, or a vanadia-tungsta-titania catalyst.

* * * * *